United States Patent

[11] 3,607,990

| [72] | Inventors | Silvio L. Giolito<br>Whitestone;<br>Walter Stamm, Tarrytown, both of N.Y. |
|---|---|---|
| [21] | Appl. No. | 684,970 |
| [22] | Filed | Nov. 22, 1967 |
| [45] | Patented | Sept. 21, 1971 |
| [73] | Assignee | Stauffer Chemical Company<br>New York, N.Y. |

[54] PROCESS FOR THE MANUFACTURE OF PENTAERYTHRITOL PHOSPHITE HEPTANOATE
5 Claims, No Drawings

| [52] | U.S. Cl. | 260/971, 252/49.8, 260/30.6, 260/937 |
|---|---|---|
| [51] | Int. Cl. | C07d 105/04, C08f 45/50 |
| [50] | Field of Search | 260/937, 971 |

[56] References Cited
UNITED STATES PATENTS
3,155,703  11/1964  Emmons et al. .............. 260/937

*Primary Examiner*—Charles B. Parker
*Assistant Examiner*—Anton H. Sutto
*Attorneys*—Daniel C. Block, Robert C. Sullivan, Donald M. MacKay, Paul J. Juettner, Wayne C. Jaeschke and Daniel S. Ortiz

ABSTRACT: A process for manufacturing pentaerythritol phosphite heptanoate which comprises the step of reacting triphenyl phosphite with pentaerythritol to form an impure pentaerythritol phosphite intermediate. The impure pentaerythritol phosphite intermediate is then reacted with phenylheptanoate to form a crude pentaerythritol phosphite heptanoate in commercial yields. The end product can optionally be flash distilled to remove the impurities. The product of this process is known to be useful as a plasticizer for vinyl chloride and the like, and as an additive to lubricating oil base stocks to increase wear resistance.

3,607,990

PROCESS FOR THE MANUFACTURE OF PENTAERYTHRITOL PHOSPHITE HEPTANOATE

BACKGROUND OF THE INVENTION

In the manufacture of pentaerythritol phosphite heptanoate, it is the practice to first react pentaerythritol with triphenyl phosphite in approximately stoichiometric portions. The two components of the reaction are charged into a reaction vessel and heated under vacuum. The reaction product is pentaerythritol phosphite mixed with phenol. As is well understood in the art, the phenol within this mixture boils off readily and can be removed by simple distillation under vacuum. However, pentaerythritol phosphite formed by this process is substantially impure and requires extensive distillation procedures under high vacuum and high temperature to remove these impurities. The pentaerythritol phosphite is then reacted with phenylheptanoate which can be formed by reacting phenol and heptanoyl chloride. The reaction between the pentaerythritol phosphite and phenylheptanoate is carried out in the presence of sodium which is a catalyst to produce pentaerythritol phosphite heptanoate and phenol. This mixture is then subjected to simple distillation under vacuum to remove the phenol and simple distillation under vacuum to remove the impurities from the reaction product. As understood in the art, the pentaerythritol phosphite heptanoate is essentially less sensitive to high temperature and moderate vacuum conditions than the pentaerythritol phosphite.

Pentaerythritol phosphate esters and phosphite esters such as pentaerythritol phosphite heptanoate, are known compounds. U. S. Pat. No. 2,643,261 discloses the use of such compounds as additives to lubricating oil. U.S. Pat. No. 3,155,703 discloses that these compounds are useful as plasticizers for vinyl chloride and the like.

The above process for manufacturing the pentaerythritol phosphite heptanoate has one exceptionally undesirable feature. This undesirable feature is the purification of the pentaerythritol phosphite formed by reacting pentaerythritol and triphenyl phosphite. The pentaerythritol phosphite material decomposes spontaneously at about 240° C. at 20 millimeters of mercury vacuum. To avoid the spontaneous decomposition, this process requires complex distillation procedures and distilling equipment so as to provide an essentially pure product for further reacting with the phenylheptanoate.

BRIEF DESCRIPTION OF THE INVENTION

It has been discovered that excellent yields of pentaerythritol phosphite heptanoate can be produced by reacting pentaerythritol and triphenyl phosphite with a catalytic amount of sodium in the presence of heat in a conventional manner to form pentaerythritol phosphite mixed with phenol. This reaction product is continuously subjected to a simple distillation to remove the phenol. However, the substantially impure intermediate, pentaerythritol phosphite, is then reacted with phenylheptanoate in the presence of sodium as a catalyst to form pentaerythritol phosphite heptanoate intermixed with phenol. This reaction product is then subjected to a simple distillation to remove the phenol and an additional flash distillation at high temperatures and high vacuum to produce yields of above 75 percent. The procedure of eliminating the complex distillation of the intermediate, pentaerythritol phosphite, and employing this impure intermediate to manufacture pentaerythritol phosphite heptanoate in commercial yields is quite surprising since it was believed in the art that good yields are not obtainable on a commercial scale unless the intermediate, pentaerythritol phosphite, was in substantially pure form.

DETAILED DESCRIPTION OF THE INVENTION

In the practice of the present invention, a commercial grade of pentaerythritol is obtained and reacted with a commercial grade of triphenyl phosphite in a reaction vessel at a temperature of between 110° and 180° C., at 30 mm. hg. pressure. The product of this reaction is pentaerythritol phosphite and phenol. The pentaerythritol phosphite, however, is in a substantially impure form since there are present unreacted original components and also other undesirable intermediates which are well understood in the art. However, the reaction product is simultaneously subjected to simple vacuum distillation which essentially removes all the phenol formed during the reaction.

Phenol heptanoate is then formed by reacting phenol with heptanoyl chloride with a stoichiometric amount of trimethylamine in benzene in a reaction vessel which forms the amine salt as a byproduct. The phenylheptanoate is separated from the amine salt by filtration. The filtrate is distilled to provide an essentially pure phenylheptanoate.

Thereafter, the impure pentaerythritol phosphite is reacted with the phenylheptanoate in the presence of sodium at a temperature of between 85° and 130° C., at 30 mm. hg. pressure to form as the product pentaerythritol phosphite heptanoate with phenol. This material is simultaneously subjected to simple distillation procedures to remove the phenol and then subjected to a rapid flash distillation at high temperatures of between 213° C. and 222° C., and at approximately 20 millimeters of mercury to produce the end product in commercial yields of above 80 percent. The simple flash distillation of the pentaerythritol phosphite heptanoate can be performed on conventional equipment and is not hazardous to plant personnel and other equipment since this product is less sensitive to heat than the impure pentaerythritol phosphite.

The following examples illustrate the merits of this invention:

EXAMPLE 1

A homogeneous mixture of 1 mol, 310 grams, of triphenyl phosphite and 1 mol. of pentaerythritol was added to a 2 liter reactor fitted with a heating mantle, stirrer, motor, thermometer, distillation head, condenser, and a manometer. The unit was connected to a vacuum pump. A small piece of sodium was added to the charge and the mixture was heated to 110° C. and was placed under 30 millimeters of mercury vacuum. As the reaction proceeded, the bulk of the phenol was collected in a receiver. For a brief period of time, 30 to 45 minutes, the charge temperature rose to 180° C. Residual phenol was removed by heating at 110° C., and 20 millimeters of mercury vacuum. A near quantitative amount of phenol was obtained during this operation. The reaction product was determined to be pentaerythritol phosphite. Then, 1 mol of phenol heptanoate was added to 150 milliliters of benzene. The solution was dried by azeotropic distillation prior to reaction with the pentaerythritol phosphite intermediate as prepared above. Sodium was added to the charge and the temperature was raised to 85° C., and put under 20 millimeters of mercury vacuum during which phenol began to distill off. The temperature was raised to 130° C., during which the bulk of phenol was collected. The crude product was filtered yielding 259 grams of a technical product. The crude product was flash distilled at 213 to 222° C., yielding 207 grams of pentaerythritol phosphite heptanoate. Analysis of the crude and distilled products showed both to be of a commercial purity. The analysis indicated that the crude end product was 90.7 percent pure while the distilled product was 95.2 percent pure.

We claim:

1. A process for manufacturing pentaerythritol phosphite heptanoate comprising the steps of:
    a. reacting triphenyl phosphite with pentaerytnritol in the presence of sodium and at a temperature between about 110 and 180° C. to form an impure pentaerytnritol phosphite intermediate,
    b. reacting the impure pentaerythritol phosphite intermediate directly and in the absence of a purification step with phenol heptanoate in the presence of sodium and at a temperature between about 85 and about 130° C.; and
    c. flash distilling the pentaerythritol phosphite heptanoate of step (b) to yield pentaerythritol phosphite heptanoate.

2. The process as set forth in claim 1, wherein phenol is removed by distillation simultaneously with the reaction of step (a).

3. The process as set forth in claim 1, wherein phenol is removed simultaneously with the reaction of step (b).

4. The process as set forth in claim 1, wherein the temperature of purifying the product of step (b) is maintained between about 213 and about 222° C.

5. In a process for producing pentaerythritol phosphite heptanoate by reacting pentaerythritol with triphenyl phosphate to yield an intermediate, purifying the intermediate by distillation and subsequently reacting the intermediate with phenyl heptanoate the improvement comprising reacting the intermediate directly with the phenyl heptanoate prior to distillation.